(12) United States Patent
Fujita

(10) Patent No.: US 7,636,146 B2
(45) Date of Patent: Dec. 22, 2009

(54) ELECTRO-OPTICAL PANEL, SYSTEM WITH TERMINALS HAVING DIFFERENT CORRESPONDING CHARACTERISTICS

(75) Inventor: Shin Fujita, Suwa (JP)

(73) Assignee: Seiko Epson Corporation (JP)

( * ) Notice: Subject to any disclaimer, the term of this patent is extended or adjusted under 35 U.S.C. 154(b) by 763 days.

(21) Appl. No.: 10/914,044

(22) Filed: Aug. 6, 2004

(65) Prior Publication Data

US 2005/0057467 A1    Mar. 17, 2005

(30) Foreign Application Priority Data

Aug. 8, 2003 (JP) ............................. 2003-290650
Jun. 30, 2004 (JP) ............................. 2004-193515

(51) Int. Cl.
*G02F 1/1345* (2006.01)

(52) U.S. Cl. ...................................... 349/152; 345/204

(58) Field of Classification Search ........... 345/60–100, 345/690–699, 204–213; 349/149–152
See application file for complete search history.

(56) References Cited

U.S. PATENT DOCUMENTS

| | | | |
|---|---|---|---|
| 4,242,679 A * | 12/1980 | Morozumi et al. ............ 345/52 |
| 6,262,702 B1 * | 7/2001 | Murade ........................ 345/87 |
| 6,469,767 B2 * | 10/2002 | Onishi ......................... 349/149 |
| 6,665,037 B2 * | 12/2003 | Hagiwara ..................... 349/148 |
| 7,002,657 B2 * | 2/2006 | Hirosue et al. ............... 349/149 |
| 2002/0003595 A1 * | 1/2002 | Yazawa ........................ 349/65 |
| 2002/0018169 A1 * | 2/2002 | Kato ............................ 349/149 |

FOREIGN PATENT DOCUMENTS

| JP | 2822558 | | 9/1998 |
|---|---|---|---|
| JP | 11-223832 A | | 8/1999 |
| JP | 2003043517 A | * | 2/2003 |
| JP | 2003-152019 A | | 5/2003 |
| JP | 2003-216064 A | | 7/2003 |
| JP | 2003216064 A | * | 7/2003 |

OTHER PUBLICATIONS

*Liquid Crystal Display Technology*, by Shoichi Matsumoto, published 1996, pp. 10, 14-15, 70-71, and 326-327, Figures 1.11 and 2.14.

Examination result regarding corresponding Japanese application, Feb. 6, 2006.

* cited by examiner

*Primary Examiner*—Chanh Nguyen
*Assistant Examiner*—Allison Walthall
(74) *Attorney, Agent, or Firm*—Harness, Dickey & Pierce, P.L.C.

(57) ABSTRACT

A liquid crystal panel includes a terminal group made of first to third terminal groups. A driving signal is supplied to the first and the third terminal groups. At the same time, an image signal is supplied to the second terminal group. The driving signal includes a higher frequency component than the image signal. Input terminals of the first and the third terminal groups have a larger area than the input terminals of the second terminal group, and thus the contact resistance thereof is small. Accordingly, it is possible to prevent the driving signal from becoming dull.

23 Claims, 8 Drawing Sheets

AA: LIQUID CRYSTAL PANEL

ELECTRO-OPTICAL PANEL, SYSTEM WITH TERMINALS HAVING DIFFERENT CORRESPONDING CHARACTERISTICS

RELATED APPLICATIONS

This application claims priority to Japanese Patent Application No. 2003-290650 filed Aug. 8, 2003, and 2004-193515 filed Jun. 30, 2004 which is hereby expressly incorporated by reference herein in its entirety.

BACKGROUND

1. Technical Field

The present invention relates to an electro-optical panel, an electro-optical apparatus, and an electronic system.

2. Background Art

Display devices, for example, liquid crystal display devices using a liquid crystal as an electro-optical material, are widely used for display units of various information processing systems and liquid crystal televisions as display devices in place of cathode ray tubes (CRTs).

Here, a known electro-optical apparatus has a structure, for example, as described below. That is to say, the known electro-optical apparatus includes: pixel electrodes arranged in a matrix state; an element substrate on which switching elements, such as TFTs (Thin Film Transistors), connected to the pixel electrodes, are disposed; an opposing substrate on which opposing electrodes opposed to the pixel electrodes are formed; and a liquid crystal, which serves as an electro-optical material, filled between both of these substrates. A pixel includes the switching element, the pixel electrode, the electro-optical material, and the opposing electrode, and is arranged in a matrix state. In such an arrangement, when a scanning signal is applied to the switching element through a scanning line, that switching element adopts a conductive state. In this conductive state, when an image signal having a voltage in accordance with grayscale is applied to the pixel electrode through a data line, a charge in accordance with the voltage of the image signal is stored in the liquid crystal layer between the pixel electrode and the opposing substrate. After the charge is stored, even if the switching element is turned to an off state, the storage of the charge in that liquid crystal layer is maintained by the capacitance of the liquid crystal layer itself, the storage capacitance, and the like. In this manner, when each switching element is driven, and the charge amount to be stored is controlled in accordance with grayscale, the alignment state of the liquid crystal is changed for each pixel, and thus the density changes for each pixel. It is, therefore, possible to display grayscale.

Such an electro-optical apparatus includes an electro-optical panel on which the above-described pixels are disposed in a matrix state. A scanning-line drive circuit, which drives scanning lines, and a data-line drive circuit, which drives data lines, are sometimes formed on the electro-optical panel. A power source, a driving signal, an image signal, etc. are supplied to the electro-optical panel having drive circuits. As means for supplying the power source, etc. to the electro-optical panel, techniques which connect an input terminal formed on the electro-optical panel and a flexible substrate as a connection cable through an anisotropic conductive film are known (for example, Japanese Patent No. 2822558).

Incidentally, the resistance of an input terminal becomes smaller as the area thereof becomes larger. Thus, in terms of the reduction of the resistance value, it is desirable that the size of the input terminal is large. However, if the area of the input terminal is made large in terms of the reduction of the contact resistance, there has been a problem in that all of the input terminals cannot be disposed in a limited area.

In particular, in an electro-optical panel of the type which does not contain a data-line drive circuit, or an electro-optical panel of the type which contains a multiplexer, it is necessary to take a plurality of image signals into the electro-optical panel, and thus the number of the input terminals becomes large. Together with this, when a flexible substrate, etc., are mounted, a problem of connection failure or the like has occurred. On the other hand, when the area of the input terminal is made small in terms of the reduction of the mounting area, the contact resistance increases, and there has been a problem in that the driving signal cannot be input at a proper timing.

Accordingly, it is an object of the present invention to provide an electro-optical panel and an electro-optical apparatus in which mounting parts such as a flexible substrate, etc., can be connected with high reliability, and a band necessary for signal transmission can be obtained, and to provide an electronic system using these.

SUMMARY

In order to solve the above-described problem, according to the present invention, there is provided an electro-optical panel including: a plurality of data lines; a plurality of scanning lines; a plurality of pixels disposed corresponding to intersections between the data lines and the scanning lines; a first input terminal supplied with a first input signal; a second input terminal supplied with a second input signal; and a drive circuit which controls grayscale of the pixel based on the first and the second input signals, wherein the first input signal includes a higher frequency component compared with the second input signal, and the first input terminal has a larger area than the second input terminal.

In general, the input resistance of a terminal is inversely proportional to the area thereof. Thus, the larger the area of the input terminal, the smaller the input resistance value becomes. Incidentally, the input resistance value includes the contact resistance value in case of connection of mounting parts.

According to this invention, the area of the input terminal can be changed in accordance with the transmission characteristics of the input signal, and thus it is possible to make smaller the area of the input terminal capable of sufficiently transmitting the signal in spite of a large time constant. Whereas for the input terminal supplied with the input signal which is required to have a small time constant characteristic, it becomes possible to obtain a large area. In this case, it is preferable that the area of the input terminal supplied with the plurality of input signals is set in accordance with the frequency characteristics of the input signal. For an input signal which includes a high-frequency component, the input signal waveform can be captured without becoming dull by setting the time constant to a small value. Whereas for the input signal which consists of relatively low-frequency components, there is no problem even if the time constant is large, and thus the area of the input terminal can be made small.

More specifically, it is preferable that the plurality of input signals include a plurality of driving signals and a plurality of image signals, the frequency characteristics of the plurality of driving signals include a higher frequency component compared with the frequency characteristics of the plurality of image signals, and the area of the first input terminal supplied with a plurality of driving signals is larger than the area of the second input terminal supplied with the plurality of the image signals. In this case, the waveform of the driving signal is captured into the electro-optical panel without becoming dull, and thus an erroneous operation of displaying an image can be prevented. At the same time, the area of the input terminal of the image signal can be made small, and thus multiple input terminals can be disposed in a limited area. As described above, by focusing attention on the frequency characteristics of the input signals and allocating the area of the input terminals, it becomes possible to appropriately dispose input terminals in a limited area.

In the above-described electro-optical panel, it is preferable that the first input terminal and the second input terminal are formed in line on a substrate, the second input terminal is disposed in the central part of the substrate, and the first input terminal is disposed at the outer side of the substrate. When connecting each terminal with ACF, heat and pressure are applied, and thus the outer side of ACF tends to have a larger extension rate than the central part. Therefore, by disposing an input terminal having a wider area at a more outer side than the input terminal having a smaller area, it is possible to prevent a connection failure because of the difference in the contraction rates as long as the input terminal is a large one even if a slight misalignment of the connection arises.

Furthermore, the electro-optical panel preferably includes a third input terminal, wherein the third input terminal is a power source terminal supplied with a power source, and the area of the third input terminal is not smaller than that of the first input terminal. In general, if a power source, which is input into a power terminal, has a high resistance, the voltage is trapped, and there is a strong possibility that a predetermined voltage cannot be obtained. Therefore, the power source preferably has as low a resistance as possible. Accordingly, in the above-described panel, the power terminal to which power is supplied preferably has the same area or more as the area of the input terminal to which the driving signal is supplied. With this arrangement, it becomes possible to decrease the resistance, and to supply a predetermined voltage. Also, the larger as possible the power source terminal, the lower the resistance becomes, and thus the power terminal may include a plurality of adjacent terminals of the first input terminal or the second input terminal. Thus, the area of the input terminal can be increased, and the resistance can be decreased.

In the above-described electro-optical panel, a plurality of the power source terminals to which power is supplied, a plurality of the first input terminals, and a plurality of the second input terminals are preferably included; the plurality of the power source terminals, the plurality of the first input terminals, and the plurality of the second input terminals are preferably formed in line on a substrate; and a pitch interval of the adjacent first input terminals is preferably an integer multiple of a pitch interval of the adjacent second input terminals.

According to this invention, when mounting members are mounted onto a plurality of power source terminals and a plurality of input terminals, the estimation of the contraction rate of the mounting members becomes easy, thereby it is possible to prevent a mounting failure in advance.

Furthermore, according to the present invention, there is provided an electro-optical panel including: on a substrate, a plurality of data lines; a plurality of scanning lines; an image display area which includes a plurality of pixels disposed corresponding to intersections between the data lines and the scanning lines; a scanning-line drive circuit for driving the pixels; a data-line drive circuit for supplying data signals to the pixels; and an input terminal group for supplying signals to the scanning-line drive circuit and the data-line drive circuit, wherein the scanning-line drive circuit is disposed along one side of the substrate on the substrate, the data-line drive circuit is disposed along a side which is not opposed to the one side on the substrate, the input terminal group is disposed along the data-line drive circuit and is disposed at an edge side of the substrate further than the data-line drive circuit, the input terminal group has a first input terminal group for supplying a driving signal to the scanning-line drive circuit and a second input terminal group for supplying an image signal to the data-line drive circuit, the second input terminal is disposed in the central part of the input terminal group, the first input terminal is disposed at the outer side of the input terminal group, and the first input terminal has a larger area than the second input terminal.

With this arrangement, it becomes possible for the wiring lines from the second terminal to the data-line drive circuit and the wiring lines from the first input terminal to the scanning-line drive circuit not to intersect with each other. Also, since the wiring lines are not drawn around, it is possible to suppress the generation of wiring resistance and parasitic capacitance. Since the area of the input terminal of the driving signal having a high frequency component is larger than the area of the input terminal of the image signal having a lower frequency component, the contact resistance can be made low, and thus the signal can be prevented from becoming dull. Also, the input terminal having a large area is disposed at a more outer side than the input terminal having a small area. In the connection of the input terminal and the ACF, etc., in general, the ACF tends to have a larger extension rate at the outer side than in the central part. However, if the area of the outer input terminal is made large, even if the misalignment due to the difference of the extension rate occurs, it is possible to prevent a connection failure.

Furthermore, the electro-optical panel preferably includes a fourth input terminal for supplying a driving signal to the data-line drive circuit, wherein the fourth input terminal has an area equal to an area of the first input terminal, and the fourth input terminal is preferably disposed between the first input terminal and the second input terminal.

In this manner, by preferably disposing the terminals having a large area on the periphery of the substrate together, it is possible to prevent a mounting failure.

Next, an electro-optical apparatus according to the present invention includes: an electro-optical panel described above; power source means for supplying the power source; and signal generation means for supplying the first input signals and the second signals. Since this electro-optical apparatus includes the above-described electro-optical panel, it is possible to connect a mounting part such as a flexible substrate, etc., with high reliability, and it becomes possible to obtain a band necessary for the transmission of the signals.

Also, an electro-optical apparatus according to the present invention includes: an electro-optical panel described above; an external substrate which includes power source means for supplying the power source and signal generation means for supplying the input signals; and a flexible substrate which connects the external substrate and the electro-optical panel, wherein the flexible substrate is preferably connected to the plurality of power source terminals and the plurality of first input terminals and the plurality of the second input terminals through an anisotropic conductive film.

Here, wiring lines are preferably formed corresponding to a reference pitch interval of the second input terminals on the flexible substrate. For a terminal group in which terminals having different widths are mixed, it is possible to reliably connect each wiring line. For a terminal having a large area, a plurality of wiring lines are assigned, and thus it is possible to reduce the contact resistance and the wiring resistance.

Next, an electronic system according to the present invention includes an electro-optical apparatus described above. Such an electronic system includes a liquid crystal projector, a personal computer, a mobile phone, an electronic camera, a PDA, etc.

In this manner, according to the present invention, it is possible to provide an electro-optical panel and an electro-optical apparatus which can connect a mounting part such as a flexible substrate, etc., with high reliability, and can obtain a band necessary for the transmission of the signals, and an electronic system using these.

DETAILED DESCRIPTION

In the following, a description will be given of an embodiment according to the present invention with reference to the drawings. In this regard, in this embodiment, a description will be given by taking a liquid crystal panel, which uses a liquid crystal as an electro-optical material, as an example of an electro-optical panel, and by taking a liquid crystal device, which uses a liquid crystal panel, as an example of an electro-optical apparatus. However, the present invention is not limited to this, and an organic EL panel including an organic light-emitting diode element, and the like are included in the electro-optical panel as a matter of course.

1. Mechanical Structure of Liquid Crystal Panel

Figure 1:
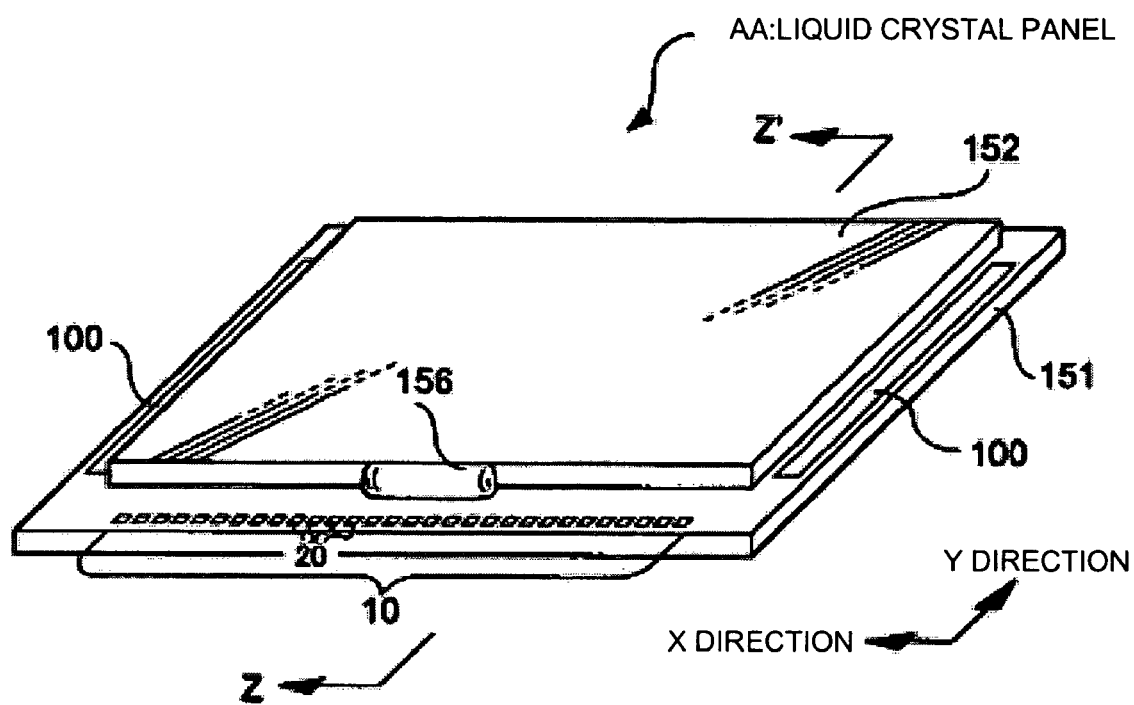
FIG. 1 is a perspective view illustrating the structure of a liquid crystal panel AA according to an embodiment of the present invention.
Figure 2:
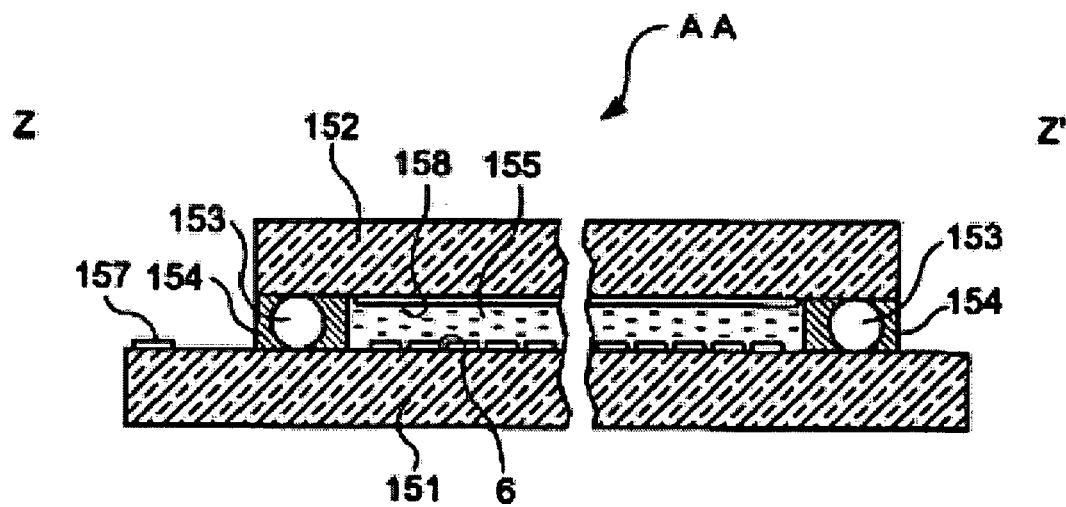
FIG. 2 is a cross-sectional view taken on Z-Z' line of FIG. 1.

First, a description will be given of the mechanical structure of a liquid crystal panel AA according to the first embodiment with reference to FIGS. 1 and 2. Here, FIG. 1 is a perspective view illustrating the structure of the liquid crystal panel AA. FIG. 2 is a cross-sectional view taken on Z-Z' line of FIG. 1.

As shown in these figures, the liquid crystal panel AA has a structure in which an element substrate 151 including glass or a semiconductor, or the like, on which a pixel electrodes 6, etc. are formed; and a transparent opposing substrate 152 including glass, etc. on which a common electrode 158 is formed, are bonded together by a sealing material 154 mixed with a spacer 153, while keeping a certain gap apart, with the electrode-formed surfaces being opposed to each other, and a liquid crystal 155 as an electro-optical material is enclosed in the gap. In this regard, the sealing material 154 is formed along the surroundings of the substrate of the opposed substrate 152, and has an opening in part in order to enclose the liquid crystal 155. Thus after enclosing the liquid crystal 155, the opening part is closed by a closing material 156.

Here, a terminal group 10 is formed at one outer side of the sealing material 154 on the opposed surface of the element substrate 151. The terminal group 10 consists of a plurality of input terminals 20. An image signal is supplied to a part of the plurality of input terminals 20 to drive data lines 3 extending in a Y direction. Furthermore, the terminal group 10 is formed at this side. Also, a scanning-line drive circuit 100 is formed on one side adjacent to this side. Scanning lines 2 extending in an X direction are individually driven from both of the sides.

The terminal group 10 is electrically and mechanically connected to a mounting member through an anisotropic conductive film. The mounting member of this example includes a flexible substrate as a connection cable and external substrate. The common electrode 158 of the opposed substrate 152 is conductive to the element substrate 151 through a conductive material provided at least on one of the four corners of the bonding parts with the element substrate 151. In addition, depending on the use of the liquid crystal panel AA, the opposed substrate 152 is provided with for example, first, a color filter arranged in a stripe-shaped state, a mosaic-shaped state, a triangle-shaped state, etc.; second, for example, a black matrix such as a resin black made by dispersing a metallic material such as chrome or nickel, and carbon, titanium on photo resist; third, a back light emitting light to the liquid crystal panel AA. In particular, in the case of use for color light modulation, a color filter is not formed, and a black matrix is provided on the opposed substrate 152.

In addition, alignment layers, which have undergone rubbing processing individually in a predetermined direction, etc. are disposed on the opposed surfaces of the element substrate 151 and the opposed substrate 152. At the same time, a polarizer (omitted in the figure) in accordance with the alignment direction is disposed on each of the back surfaces. However, if a polymer-dispersed liquid crystal, in which droplets are dispersed in the polymer, is used as a liquid crystal 155, the above-described alignment layer, polarizer, etc. become unnecessary. As a result, the light utilization rate is increased, and thus it is advantageous in achieving higher luminance and lower power consumption.

In this regard, in place of forming a part of or the entire peripheral circuit, such as the scanning-line drive circuit 100, etc., on the element substrate 151, for example, a driving IC chip mounted on a film may be electrically and mechanically connected through the anisotropic conductive film disposed at a predetermined position on the element substrate 151 using a TAB (Tape Automated Bonding) technique. Alternatively, the driving IC chip itself may be electrically and mechanically connected through the anisotropic conductive film disposed at a predetermined position on the element substrate 151 using a COG (Chip On Glass) technique.

2. Electrical Structure of Liquid Crystal Panel

Figure 3:
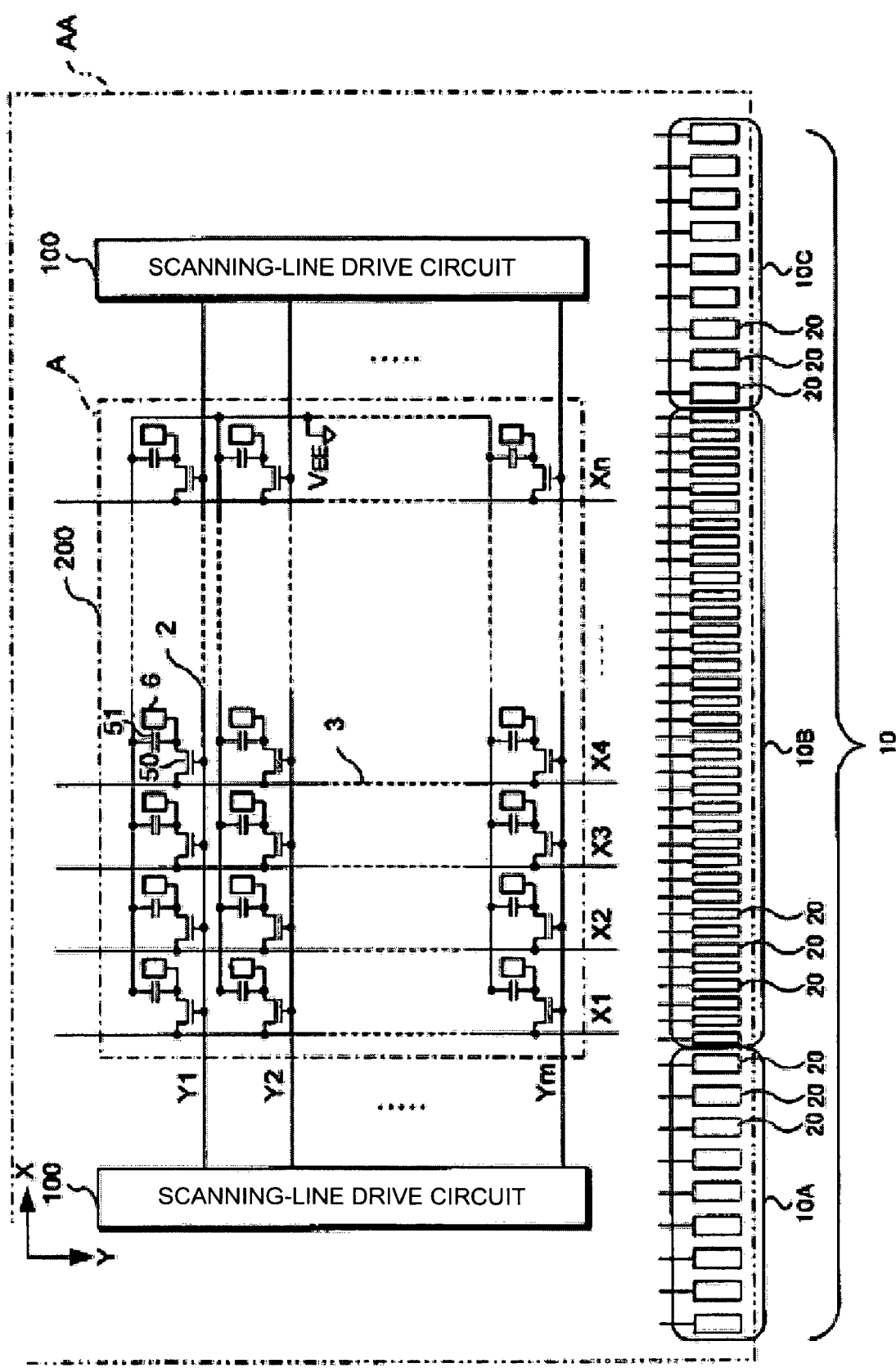
FIG. 3 is a block diagram illustrating the electrical configuration of the liquid crystal panel AA of a first embodiment.

FIG. 3 is a block diagram illustrating the electrical configuration of the liquid crystal panel. As shown in this figure, the liquid crystal panel AA includes the scanning-line drive circuit 100, an image display area A, and the terminal group 10. The terminal group 10 includes a first terminal group 10A, a second terminal group 10B, and a third terminal group 10C.

Various driving signals which drive the scanning-line drive circuit 100 and the power source are supplied to the first terminal group 10A and the third terminal group 10C. That is to say, a part of the input terminals 20, which constitute the first terminal group 10A and the third terminal group 10C, may function as a power source terminal supplied with a power source (a third input signal). At the same time, an image signal is supplied to the second terminal group 10B. It is better that the resistance of the power source terminal should be kept as small as possible, because a predetermined voltage cannot be obtained by a voltage trap when the resistance is high. Thus, the power source terminal preferably has the same area as the first terminal group or more. Furthermore, if the power source terminal is structured in two parts such that the power source terminal extends over both of the two terminals adjacent with the first terminal group or the second terminal group, the resistance can be further suppressed. Also, it is preferable that the power source terminal is disposed at the side more outer than the input terminal of the driving signal on the substrate. That is to say, it is preferable that, in the input terminal group arranged in line on one side of the substrate, an input terminal of the image signal is disposed in the central part, and the input terminal of drive circuit and the power source terminal are disposed in this order from the center.

In this example, the driving signal (first input signal) and the image signal (second input signal) are supplied to the liquid crystal panel AA as input signals in addition to the power source. Among them, the driving signal includes a Y transmission start pulse DY, a Y clock signal YCK, an inverted Y clock signal YCKB, and the like. The frequency characteristics of these driving signals include a higher frequency component compared with the frequency characteristics of the image signal. Accordingly, in order to normally operate the scanning-line drive circuit 100, it is necessary for the driving signal to be transmitted without becoming dull. The driving signal is transmitted through the flexible substrate, and a distributed capacitance and a distributed resistance exist on this transmission path, equivalently constituting a low-path filter. Accordingly, in order for the driving signal to be transmitted without becoming dull, it is necessary to decrease the time constant of the equivalent low-path filter. Among distributed resistors, the rate of the contact resistance generated in the input terminal 20 is large, so that the resistance cannot be disregarded. The contact resistance becomes smaller as the area of the input terminal 20 becomes larger. Thus, in this embodiment, the area of the input terminal to which the driving signal is supplied is made larger compared with that of the input terminal to which the image signal is supplied. Specifically, the input terminal 20, which is included in the first and the third terminal groups 10A and 10C, has a larger area than the input terminal 20 which is included in the second terminal group 10B.

In other words, a plurality of input terminals 20 to which input signals are supplied include a plurality of kinds of input terminals 20 having different input resistance values, and the kind of the input terminal 20 to which each input signal is supplied is determined in accordance with the transmission characteristic required for transmitting each input signal. Thus, a driving signal having a relatively high frequency component is correctly transmitted. At the same time, the area of the input terminal 20 included in the second terminal group 10B to which the image signal having a relatively low frequency component is supplied is made smaller than the area of the input terminal 20 included in the first terminal group 10A and the third terminal group 10C, and thus it becomes possible to dispose a necessary number of the input terminals 20 in a limited area.

Next, the scanning-line drive circuit 100 includes a shift register, etc. The Y transmission start pulse DY, the Y clock signal YCK, the inverted Y clock signal YCKB, a high potential power source VHH, and a low potential power source VSS are supplied to the scanning-line drive circuit 100. In FIG. 3, the driving signal and the power source are supplied from the first terminal group 10A to the scanning-line drive circuit 100 of the left side, whereas the driving signal and the power source are supplied from the third terminal group 10C to the scanning-line drive circuit 100 of the right side.

The scanning-line drive circuit 100 transmits the Y transmission start pulse DY in sequence in synchronism with the Y clock signal YCK and the inverted Y clock signal YCKB using the shift register, and further performs a level conversion to generate the scanning signals Y1, Y2, . . . , Ym, and outputs each signal on each scanning line 2.

Next, as shown in FIG. 3, in the image display area A, m (m is a natural number of 2 or more) pieces of scanning lines 2 are arranged in parallel along the X direction, whereas n (n is a natural number of 2 or more) pieces of data lines 3 are arranged in parallel along the Y direction. In the vicinity of the intersections between the scanning lines 2 and the data lines 3, the gate of a TFT 50 is connected to the scanning line 2, the source of the TFT 50 is connected to the data line 3, and the drain of the TFT 50 is connected to a pixel electrode 6. Each pixel is constituted by the pixel electrode 6, an opposed electrode (which will be described below) formed on the opposed substrate, and a liquid crystal sandwiched between both of these electrodes. As a result, the pixels are arranged in a matrix state corresponding to each intersection between the scanning lines 2 and the data lines 3.

Also, each scanning line 2, to which the gate of the TFT 50 is connected, is supplied with scanning signals Y1, Y2, . . . , Ym in a pulse state for each line in sequence. Thus when a scanning signal is supplied onto a scanning line 2, the TFT 50 connected to that scanning line is turned on. Therefore, data-line signals X1, X2, . . . , Xn (image signal) supplied from the data line 3 at a predetermined timing are written into the corresponding pixel in sequence, and then maintained for a predetermined time period.

Since the alignment and the order of liquid crystal molecules are changed in accordance with an electric potential level applied to each pixel, it becomes possible to display grayscale by light modulation. For example, the amount of light passing a liquid crystal is restricted with the increase of the applied potential in a normally white mode, whereas the amount of light is released with the increase of the applied potential in a normally black mode. Thus, light having contrast in accordance with the image signal is emitted from each pixel as the entire liquid crystal display device. Accordingly, it becomes possible to perform a predetermined display.

3. Relationship Between Terminal Group 10 and Flexible substrate B

Figure 4:
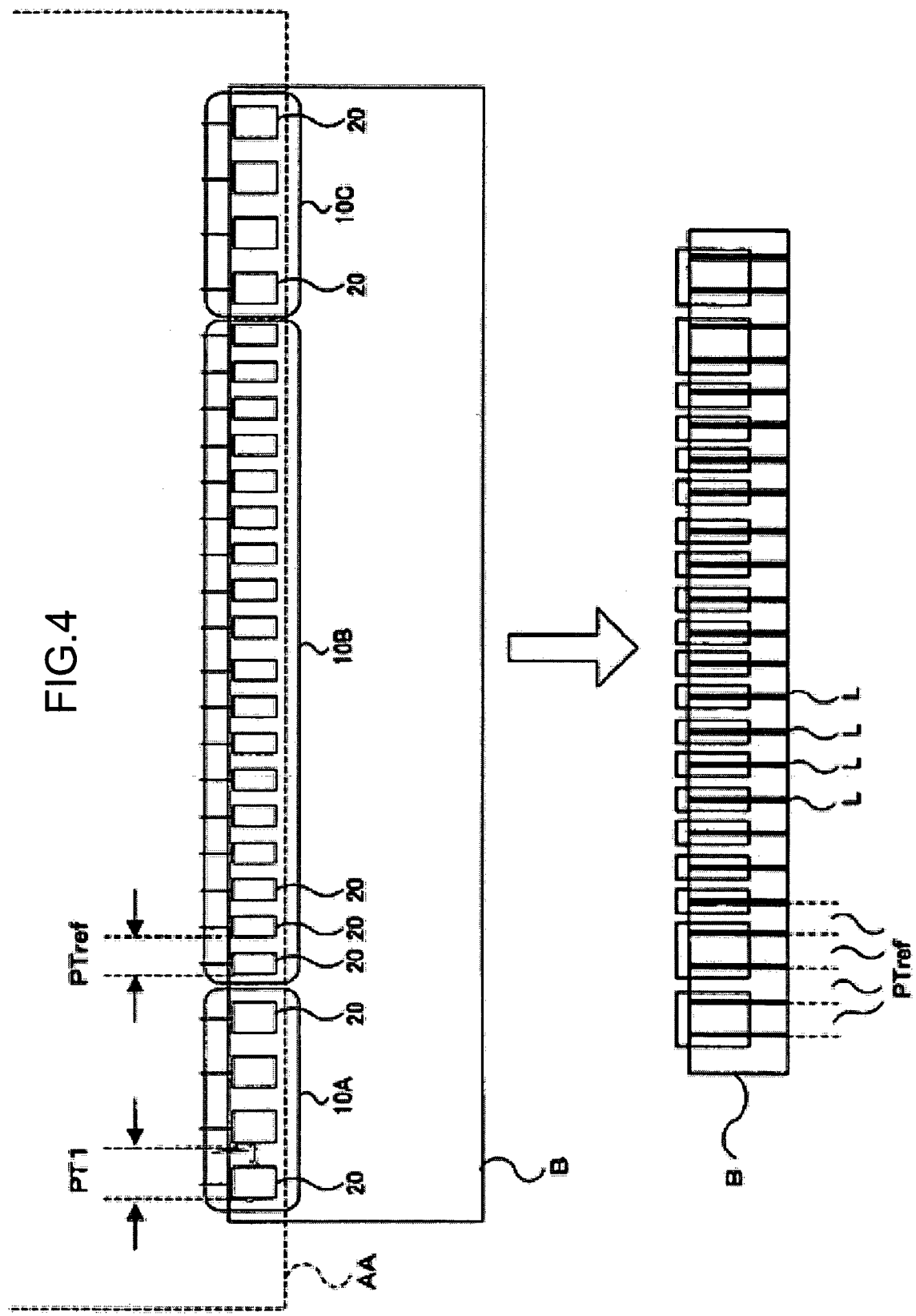
FIG. 4 is a plan view illustrating the structure concerning the connection between a terminal group 10 and a flexible substrate B according to the embodiment.

Next, a description will be given of the detailed structure of the terminal group 10 and a flexible substrate B. FIG. 4 is a plan view illustrating the structure concerning the connection between the terminal group 10 and the flexible substrate B. As described above, the terminal group 10 includes two kinds of input terminals 20 having different areas. In this example, the area of the input terminal 20 constituting the second terminal group 10B is the smallest, and the pitch between the input terminals 20 becomes the smallest. In this embodiment, among a plurality of kinds of input terminals 20 (including a power source terminal) having different areas, the pitch between the terminals having the smallest area is called a reference pitch PTref In this example, since the area of the input terminal 20 constituting the second terminal group 10B is the smallest, the interval of the input terminal 20 constituting the second terminal group 10B becomes the reference pitch PTref.

In contrast, the pitches of the input terminals 20 constituting the first terminal group 10A and the third terminal group 10C are the same. This pitch is called a first pitch PT1. Furthermore, it is preferable to set the first pitch PT1 to an integer multiple of the reference pitch PTref The flexible substrate B and the terminal group 10 are connected through an anisotropic conductive film (ACF). At this time, heat and pressure are applied, and thus the flexible substrate B contracts. When the pitches are set to have a relationship of an integer multiple as described above, and when the mounting members of the flexible substrate B, etc. are mounted onto the terminal group 10, the estimation of the contraction rate of the mounting parts becomes easy, thereby it is possible to prevent a mounting failure in advance. Also, when connecting each terminal with the ACF, heat and pressure are applied, and thus the outer side of the ACF tends to have a larger extension rate than the central part. Therefore, by disposing a terminal having a wider area at the outer side than the input terminal having a smaller area, it is possible to prevent a connection failure because of the difference in the contraction rates as long as the input terminal is large even if a slight misalignment of the connection arises. Accordingly, it is desirable to dispose the input terminal having a small pitch and a small area in the central part of the substrate, and to dispose an input terminal having a large pitch and a large area at the outer side thereof.

Also, wiring lines L are formed on the flexible substrate B at intervals of the reference pitch PTref. By this, for a terminal group 10 in which input terminals 20 having different widths are mixed, each of the wiring lines L can be reliably connected. For the input terminal 20 having a large area, two wiring lines L are assigned, and thus the contact resistance and the wiring resistance can be reduced.

4. Entire Configuration of Liquid Crystal Display Device

Figure 5:
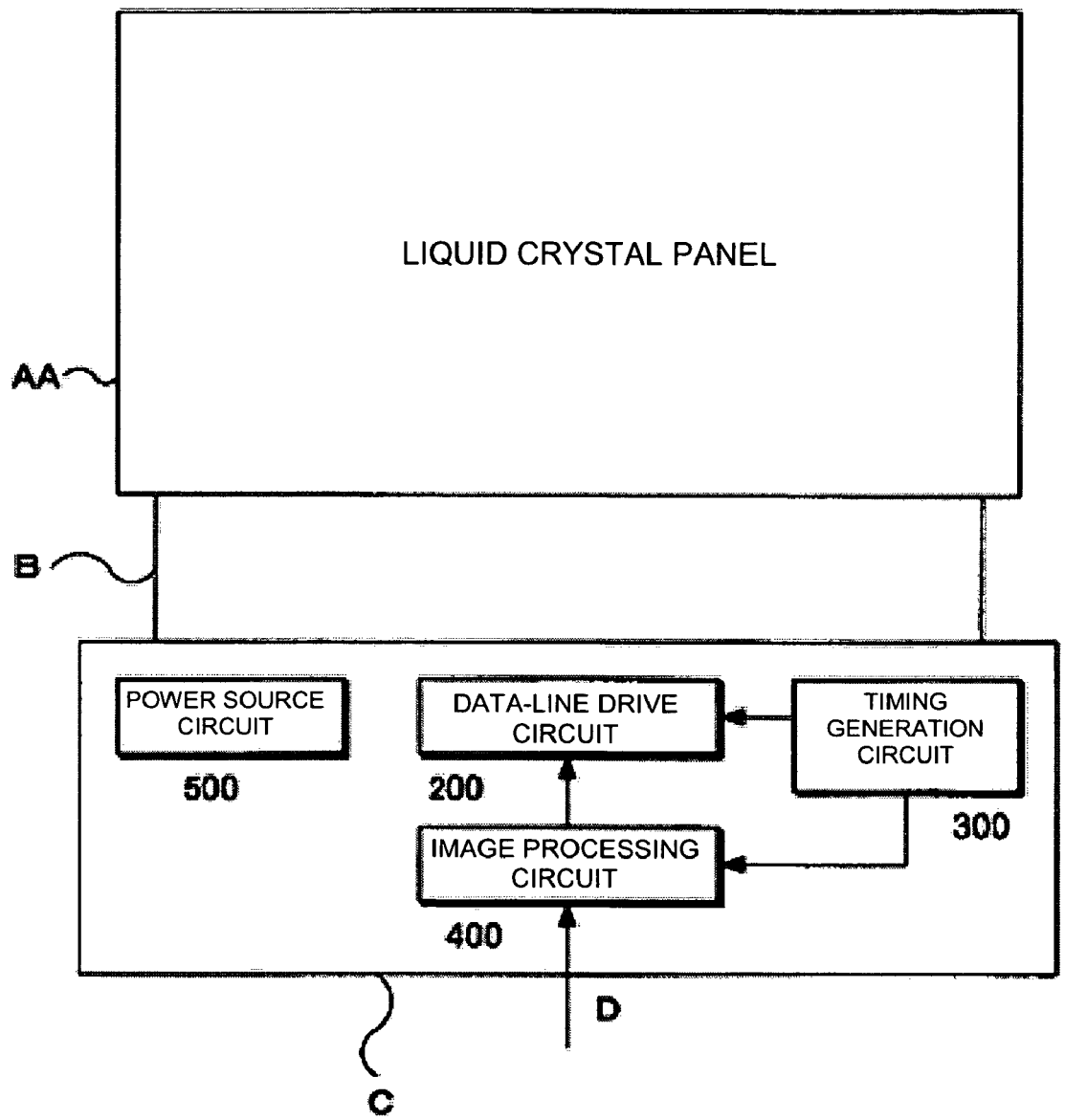
FIG. 5 is a block diagram illustrating the entire configuration of a liquid crystal display device.

FIG. 5 illustrates the entire configuration of a liquid crystal display device. An external substrate C is connected to a liquid crystal panel AA through a flexible substrate B. The external substrate C includes a data-line drive circuit 200, a timing generation circuit 300, an image processing circuit 400, and a power source circuit 500. Input image data D supplied to this liquid crystal display device has, for example, a three-bit parallel format. The timing generation circuit 300 generates the Y clock signal YCK in synchronism with the input image data D, the inverted Y clock signal YCKB, an X clock signal XCK, an inverted X clock signal XCKB, the Y transmission start pulse DY, and the X transmission start pulse DX. Also, the timing generation circuit 300 generates various timing signals for controlling the image processing circuit 400, and outputs the signals.

The Y clock signal YCK identifies a period for selecting the scanning line 2, and the inverted Y clock signal YCKB has the logic level inverted from the Y clock signal YCK. The X clock signal XCK identifies a period for selecting the data line 3, and the inverted X clock signal XCKB has the logic level inverted from the X clock signal XCK.

The image processing circuit 400 performs gamma correction on the input image data D in consideration of the light transmission characteristics of the liquid crystal panel AA, and then supplies the image data to the data-line drive circuit 200. The data-line drive circuit 200 transmits the X transmission start pulse DX in sequence in synchronism with the X clock signal XCK and the inverted X clock signal XCKB to generate a sampling signal. The data-line drive circuit 200 samples the image data using the generated sampling signal to generate line sequential image data. Furthermore, the data-line drive circuit 200 performs D/A conversion on the image data to generate line sequential image signals. This image signal is supplied to the liquid crystal panel AA through the flexible substrate B.

The power source circuit 500 supplies a predetermined power source to the timing generation circuit 300 and the image processing circuit 400 in addition to supplying a high potential power source VDD and a low potential power source VSS to the scanning-line drive circuit 100. In the above configuration, the data-line drive circuit 200, the timing generation circuit 300, and the image processing circuit 400 function as signal generation means for supplying input signals to the liquid crystal panel AA.

5. Applications

Figure 6:
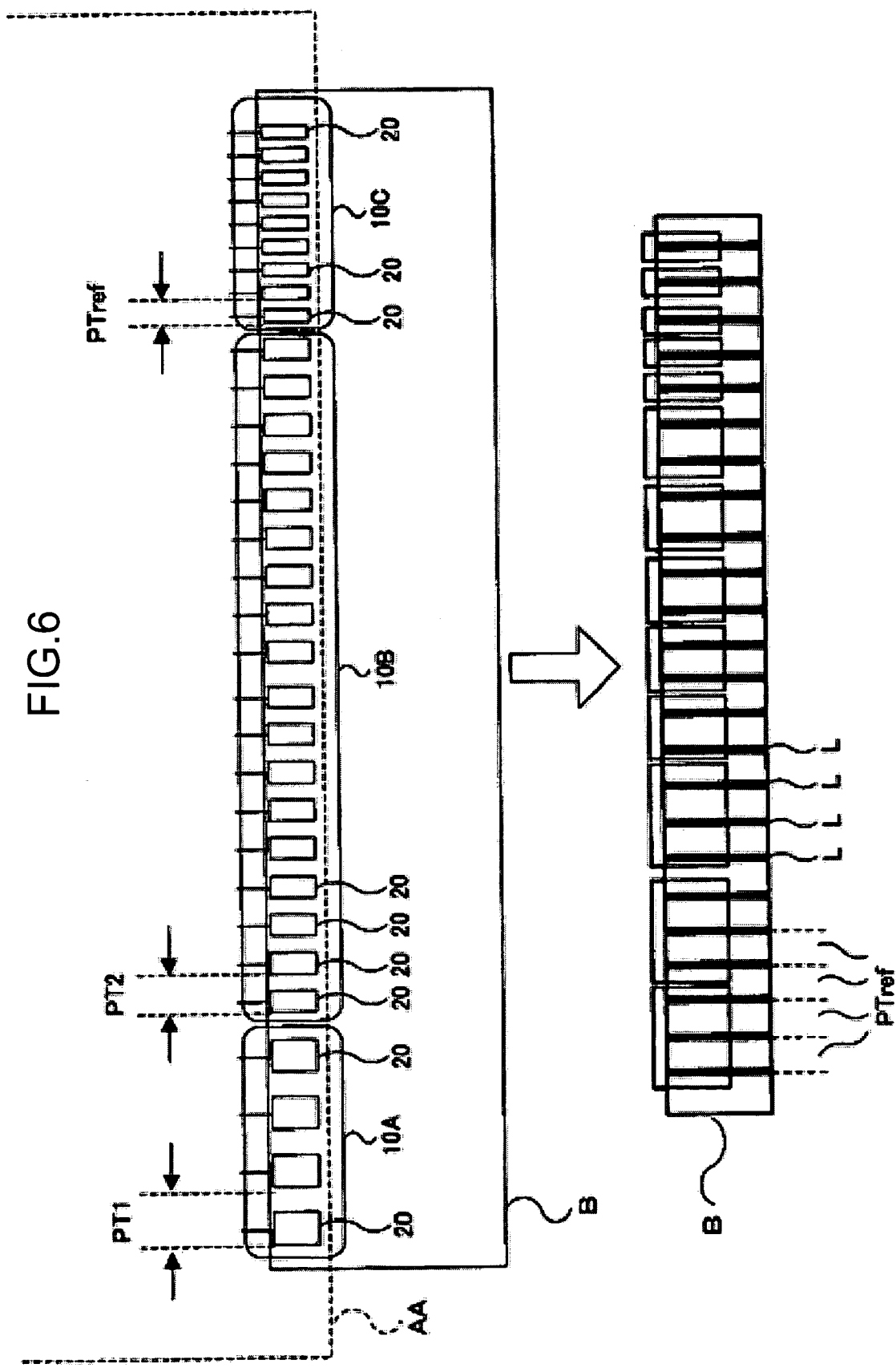
FIG. 6 is a plan view illustrating the structure concerning the connection between a terminal group 10 and a flexible substrate B according to an application.

5-1: Relationship Between the Terminal Group 10 and Flexible Substrate B In the above-described embodiment, two kinds of terminals having different areas are used for the input terminal 20. However, the present invention is not limited to this, and the present invention may be applied to the case where the input terminal 20 of three kinds or more is provided. FIG. 6 is a plan view illustrating the structure concerning the connection between terminal groups 10 and a flexible substrate B according to an application. In this example, the area of the input terminal 20 constituting the third terminal group 10C is the smallest. Thus, the interval of the input terminal 20 constituting the third terminal group 10C becomes the reference pitch PTref The input terminal 20 constituting the second terminal group 10B is formed at intervals of a second pitch PT2, and the input terminal 20 constituting the first terminal group 10A is formed at intervals of a first pitch PT1.

In this case, among PTref, PT1, and PT2, the following relationship holds: 2PTref=PT2, and 3PTref=PT1. That is to say, among a plurality of power source terminals and a plurality of kinds of input terminals, given that the pitch of the terminals having the smallest area is PTref, the pitches PT1 and PT2 of the input terminals of the other kinds, or the pitches PT1 and PT2 of the power source terminals become an integer multiple of the reference pitch PTref.

Also, the wiring lines L are formed at intervals of the reference pitch PTref on the flexible substrate B. Thus, for the terminal group 10 in which input terminals 20 having different widths are mixed, it is possible to reliably connect each wiring line L. For an input terminal 20 having a large area, two or three wiring lines L are assigned, and thus it is possible to reduce the contact resistance and the wiring resistance.

5-2: Second embodiment of Electro-Optical Apparatus

Figure 10:
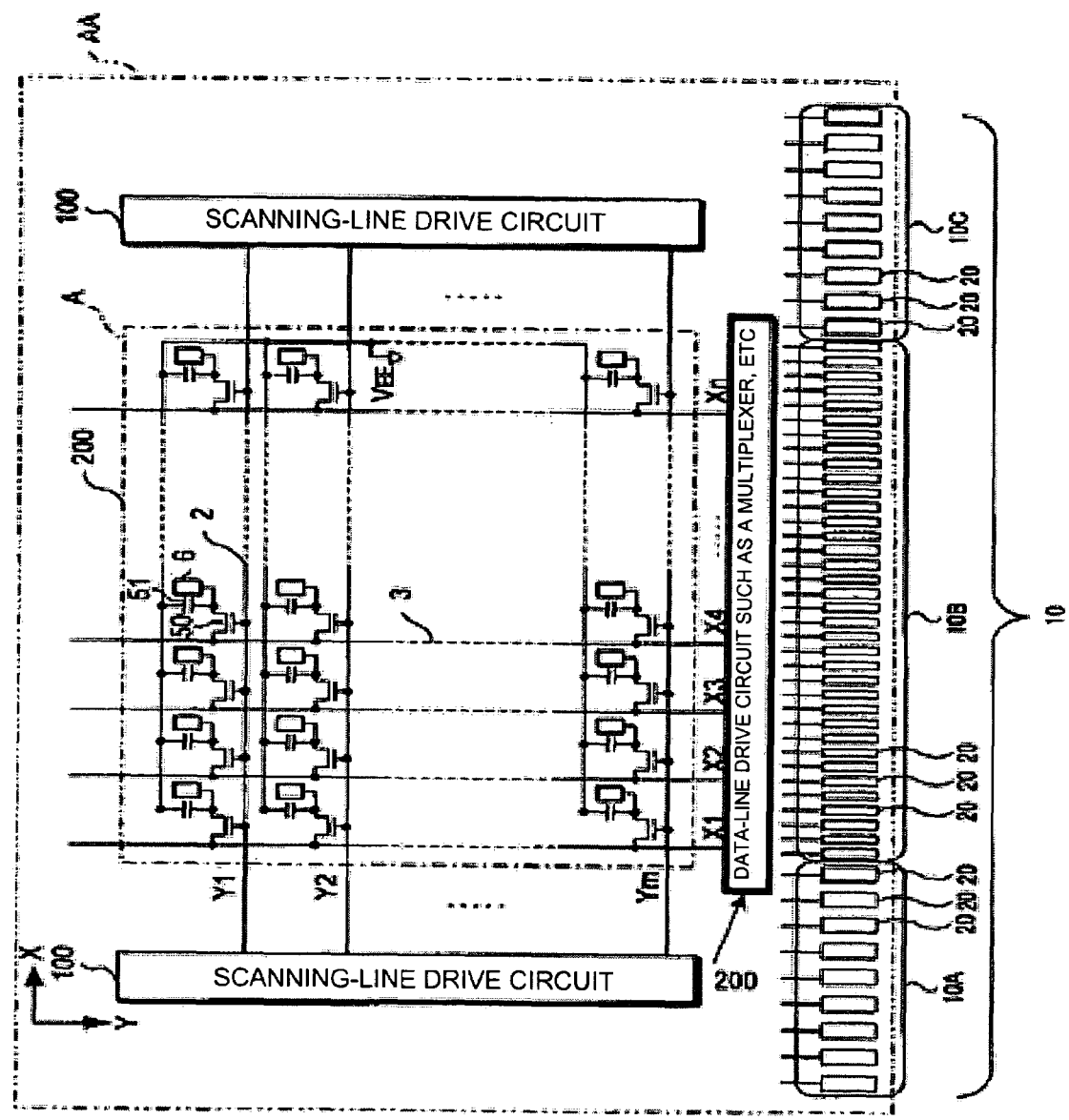
FIG. 10 is a block diagram illustrating the configuration of the liquid crystal panel of a second embodiment.

A description will be given of a second embodiment of the present invention using FIG. 10. FIG. 10 is a block diagram of the second embodiment, and is a figure illustrating a layout. The second embodiment has almost the same configuration as the first embodiment described above. A different point is that the second embodiment includes the disposition of the data-line driver circuit such as a multiplexer, and the like. In this configuration, an image display area A is disposed in the central part of the substrate, scanning-line drive circuits 100 are disposed along the two sides opposed to each other in the surroundings on the substrate, the data-line drive circuit 200 is disposed along one side on which the scanning-line drive circuits 100 are not disposed in the surroundings of the substrate, and further, each input terminal (input terminals for the driving signal and the image signal) is disposed at a more outer side of the substrate than the data-line drive circuit 200.

In this embodiment, a driving signal 10A is input into the scanning-line drive circuit 100 through the input terminal 10A, and an image signal 10B is input into the data-line drive circuit 200, such as a multiplexer, etc., through the input terminal 10B. The input terminal 10A has a larger area compared with the input terminal 10B. Furthermore, the input terminal 10B is disposed in the central part of the substrate, and the input terminal 10A is disposed at the outer side. Also, the input terminal to which the driving signal (fourth input signal) of the multiplexer is input has an area equal to the terminal to which the driving signal of the scanning-line drive circuit is input. Furthermore, the terminal to which the driving signal of the multiplexer is input is disposed at a more peripheral side than the terminal to which the image signal is input, and, in particular, is desirable to be disposed between the terminal to which the driving signal of the scanning-line drive circuit is input and the terminal to which the image signal is input. With this arrangement, by disposing the terminals having a large area and the terminals having a small area at each of the parts together, respectively, it is possible to prevent a connection failure of an ACF, etc. Also, with this arrangement, it becomes possible for the wiring line from the input terminal 10B to the data-line drive circuit 200 and the wiring line from the input terminal 10A to the scanning-line drive circuit 100 not to intersect with each other. Also, since the wiring lines are not drawn around, it is possible to suppress the generation of wiring resistance and parasitic capacitance.

Also, in the embodiments described above, a description has been given of the case where the switching element of the pixel is a three-terminal element typified by a TFT. However, the switching element may be constituted by a two-terminal element such as a diode, etc. However, when a two-terminal element is used as the switching element of a pixel, it is necessary to form the scanning line 2 on one of the substrates, to form the data line 3 on the other of the substrates at the same time, and to form the two-terminal element between either of the scanning line 2 or the data line 3, and the pixel electrode. In this case, the pixel is constituted by the two-terminal element connected in series between the scanning line 2 and the data line 3, and a liquid crystal.

Also, the present invention has been described as a liquid crystal display device of an active matrix type. However, the present invention is not limited to this, and can be applied to a liquid crystal display device of a passive matrix type using an STN (Super Twisted Nematic) liquid crystal. Furthermore, the present invention can be applied to a display device which uses an electroluminescent element as an electro-optical material in addition to a liquid crystal and performs display by the electro-optical effects thereof. That is to say, the present invention can be applied to all the electro-optical apparatuses having a similar structure as the liquid crystal device described above.

Also, in the above-described embodiment, the data-line drive circuit 200 is disposed on the external substrate C. However, the data-line drive circuit 200 may be disposed on the flexible substrate B. Furthermore, a multiplexer may be disposed at the end of each data line 3 of the liquid crystal panel AA. In this case, the number of image signals supplied to the liquid crystal panel AA can be reduced, and thus the number of input terminals 20 can be reduced. In addition, the data-line drive circuit 200 may be formed on the liquid crystal panel AA.

5-3: Electronic System

Next, a description will be given of the case where the liquid crystal display apparatus described above is applied to various electronic systems.

5-3-1: Projector

Figure 7:
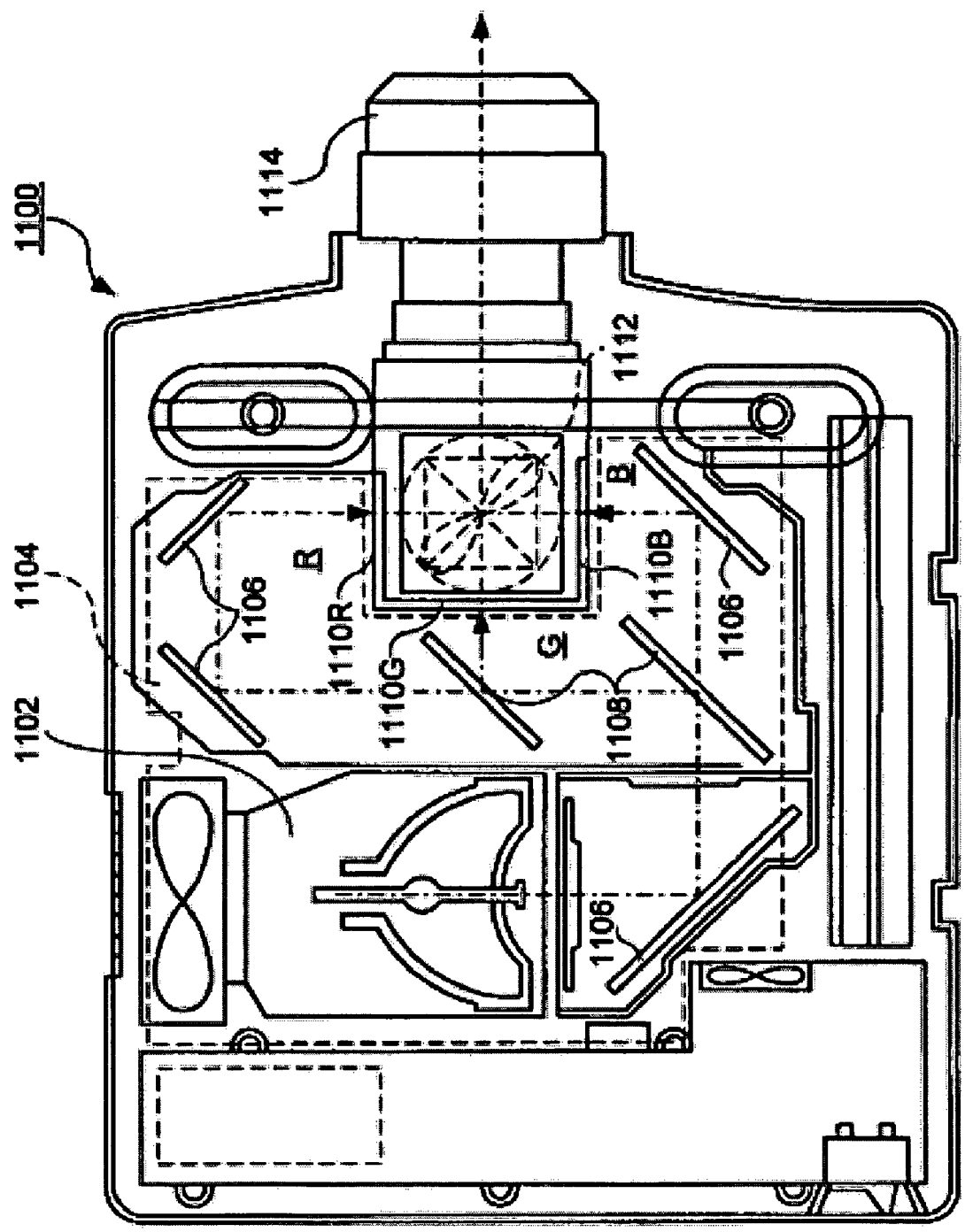
FIG. 7 is a cross-sectional view of a video projector, which is an example of an electronic system to which the liquid crystal display device is applied.

First, a description will be given of a projector using this liquid crystal display device as light valves. FIG. 7 is a plan view illustrating an example of the structure of the projector.

As shown in this figure, a lamp unit 1102 including a white light source such as a halogen lamp, etc. is provided in the inside of a projector 1100. The projection light emitted from the lamp unit 1102 is separated into three primary colors, RGB, by four mirrors 1106 and two dichroic mirrors 1108 disposed in a light guide 1104, and enters into liquid crystal panels 1110R, 1110B, and 1110G, each of which serves as a light valve corresponding to each primary color.

The structure of the liquid crystal panels 1110R, 1110B, and 1110G is the same as the above-described liquid crystal panel AA, and the individual panels are driven by primary color signals of R, G, and B, supplied from the image signal processing circuit (omitted in the figure). Then each light modulated by one of these liquid crystal panels enters into a dichroic prism 1112 from three directions. The R and B light is deflected 90 degrees via the dichroic prism 1112, while the G light goes straight through. Accordingly, each color image is synthesized. As a result, a color image is projected onto a screen, etc. through a projection lens 1114.

Here, when attention is focused on the display image by each of the liquid crystal panels 1110R, 1110B, and 1110G, the display image by the liquid crystal panel 1110G needs to be horizontally reversed with respect to the display images by the liquid crystal panels 1110R and 1110B.

In this regard, the light corresponding to each primary color, R, G, and B enters into the liquid crystal panels 1110R, 1110B, and 1110G by the dichroic mirror 1108, and thus it is not necessary to dispose color filters.

5-3-2: Mobile Computer

Figure 8:
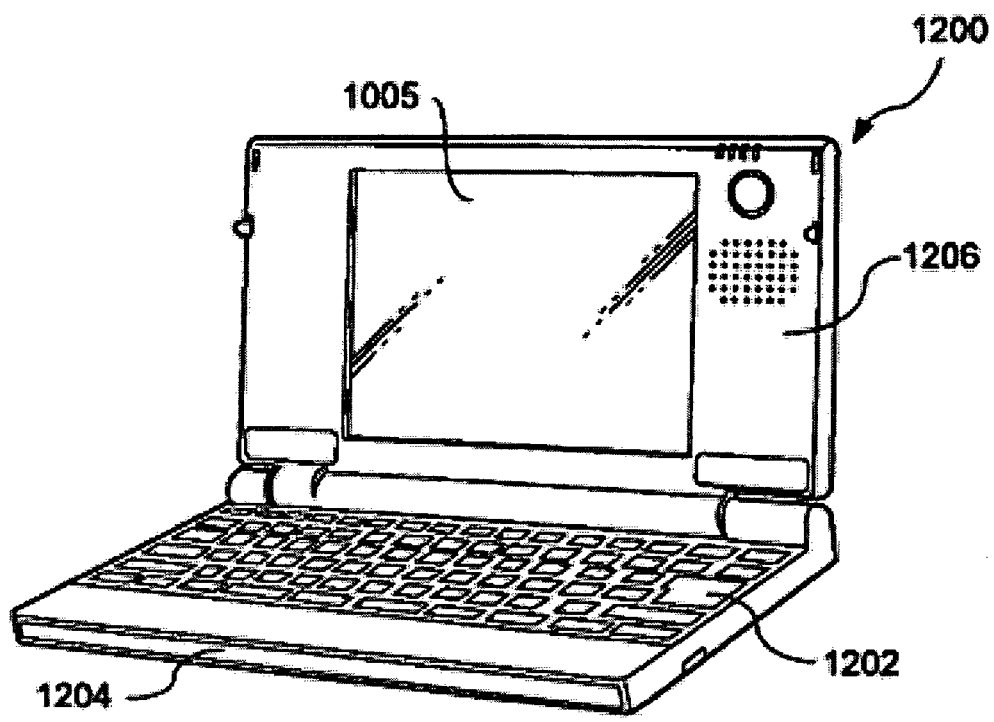
FIG. 8 is a perspective view illustrating the structure of a personal computer, which is an example of an electronic system to which the liquid crystal display device is applied.

Next, a description will be given of an example in which this liquid crystal panel AA is applied to a mobile personal computer. FIG. 8 is a perspective view illustrating the structure of such a personal computer. In the figure, a computer 1200 includes a main unit 1204 having a keyboard 1202, and a liquid crystal display unit 1206. This liquid crystal display unit 1206 is constituted by adding a back light to the back surface of the liquid crystal panel 1005 described above.

5-3-3: Mobile Phone

Figure 9:
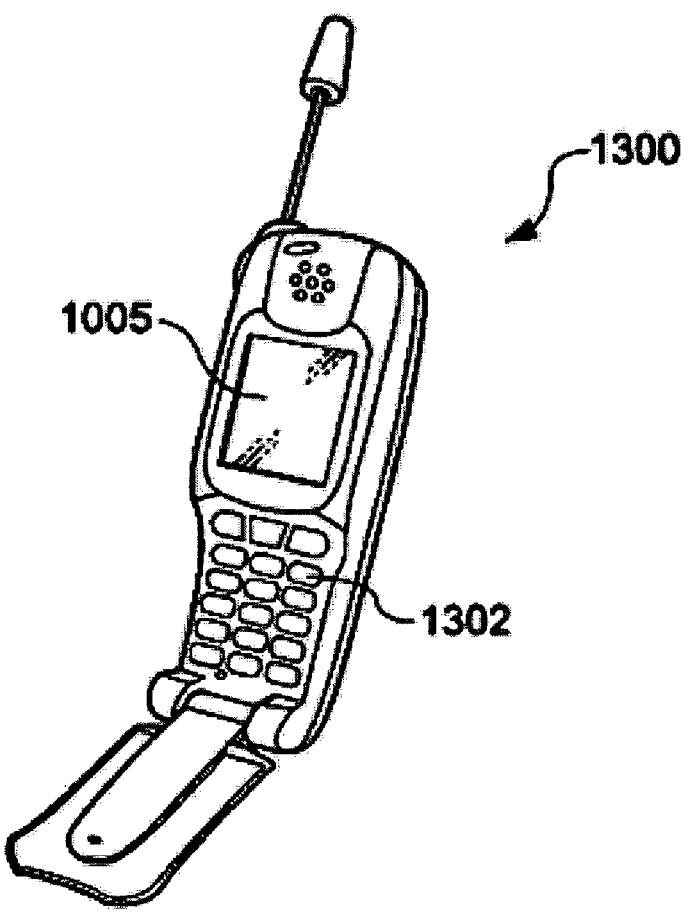
FIG. 9 is a perspective view illustrating the structure of a mobile phone, which is an example of an electronic system to which the liquid crystal display device is applied.

Furthermore, a description will be given of an example in which the above-described liquid crystal panel AA is applied to a mobile phone. FIG. 9 is a perspective view illustrating the structure of such a mobile phone. In the figure, the mobile phone 1300 includes a reflective liquid crystal panel 1005 together with a plurality of operation buttons 1302. In this reflective liquid crystal panel 1005, a front light is provided on the front surface as necessary.

In this regard, in addition to the electronic systems described with reference to FIGS. 7 to 9, the electronic systems include liquid crystal TVs, view finder-type/monitor-directly-view-type video tape recorders, car navigation systems, pagers, electronic diaries, calculators, word processors, workstations, TV telephones, POS terminals, devices with touch panels, and so on. It goes without saying that the present invention can be applied to these various electronic systems. The panel board may be a panel using an organic LED, plasma, inorganic electro-luminescent element in place of a liquid crystal as an electro-optical material. Moreover, the present invention can be applied to an electrophoretic panel such as electronic paper, and so on.

What is claimed is:

1. An electro-optical panel comprising:
a plurality of data lines;
a plurality of scanning lines intersecting the plurality of data lines;
a plurality of pixels disposed corresponding to the intersections between the data lines and the scanning lines;
a clock signal input terminal supplied with a scanning line clock signal;
an image signal input terminal supplied with an image signal;
a scanning line drive circuit that sequentially transmits a transmission start pulse in synchronization with the scanning line clock signal and outputs a scanning signal to each of the plurality of scanning lines, image signals from the plurality of data lines are supplied to pixels selected by the scanning signals;
a drive circuit which controls a grayscale of the pixels based on the scanning line clock signal and the image signal; and
a third input terminal, wherein the third input terminal comprises a power source terminal supplied with a power source, and the area of the third input terminal is not smaller than that of the first clock signal input terminal,
wherein the clock signal input terminal has a larger area than the image signal input terminal, and
wherein a plurality of the power source terminals, a plurality of the first clock signal input terminals, and a plurality of the second image signal input terminals are included;
the plurality of the power source terminals, the plurality of the first clock signal input terminals, and the plurality of the second image signal input terminals are formed in line on a substrate; and
a pitch interval of the adjacent first clock signal input terminals is an integer multiple of a pitch interval of the adjacent second image signal input terminals.

2. An electro-optical panel according to claim 1, wherein the first clock signal input terminal has a smaller input resistance compared with the image signal input terminal.

3. An electro-optical panel according to claim 1, wherein a signal supplied to the clock signal input terminal comprises a driving signal supplied to the scanning-line drive circuit.

4. An electro-optical panel according to claim 1, wherein the clock signal input terminal and the image signal input terminal, which are disposed along an edge of a substrate, are formed in line, the image signal input terminal is disposed in the central part of the substrate, and the clock signal input terminal is disposed at the outer side of the substrate.

5. An electro-optical apparatus comprising:
an electro-optical panel set forth in claim 1;
power source means for supplying the power source; and
signal generation means for supplying the input signals.

6. An electro-optical apparatus comprising:
an electro-optical panel set forth in claim 5;
an external substrate which includes power source means for supplying the power source and signal generation means for supplying the input signals; and
a flexible substrate which connects the external substrate and the electro-optical panel,
wherein the flexible substrate is connected to the plurality of power source terminals, the plurality of clock signal input terminals and the plurality of image signal input terminals through an anisotropic conductive film.

7. An electro-optical apparatus according to claim 6, wherein wiring lines are formed corresponding to a reference pitch interval of the image signal input terminals on the flexible substrate.

8. An electronic system comprising the electro-optical apparatus set forth in claim 1.

9. The electro-optical panel according to claim 1, further comprising a substrate, the clock signal input terminal and the image signal input terminal arranged in a line on an edge of the substrate, and the image signal input terminal disposed closer to a center of an edge of the substrate than the clock signal input terminal.

10. An electro-optical panel comprising:
a first substrate;
data lines;
scanning lines intersecting the data lines;
pixels disposed corresponding to intersections between the data lines and the scanning lines;
a clock-signal input terminal supplied with a clock signal and connected to a mounting member through anisotropic conductive film;
image-signal input terminals supplied with image signals and connected to the mounting member through anisotropic conductive film, the clock-signal input terminal and the image-signal input terminals being disposed along one side of the first substrate, the image signals being supplied from an external data drive circuit and being supplied simultaneously to all of the data lines; and
a scanning-line drive circuit that is formed on the first substrate and that sequentially transmits a transmission start pulse in synchronization with the clock signal,
wherein the clock-signal input terminal overlaps a first wiring of the mounting member through said anisotropic conductive film by a larger area than an area at which at least one of the image-signal input terminals overlaps a second wiring of the mounting member through said anisotropic conductive film.

11. The electro-optical panel according to claim 10, the clock-signal input terminal having a smaller resistance compared with resistance of the image signal input terminal.

12. The electro-optical panel according to claim 10 the clock-signal input terminal and the image-signal input terminal arranged in a line on an edge of the first substrate, the image-signal input terminal being disposed closer to a center of the edge of the first substrate than the clock-signal input terminal.

13. The electro-optical panel according to claim 10, the external data line circuit being formed on a second substrate other than the first substrate.

14. The electro-optical panel according to claim 10, the clock-signal input terminal being disposed further out on the first substrate relative to a central part of an outer edge of the first substrate than the image signal input terminal.

15. The electro-optical panel according to claim 10, the pixels arranged on the first substrate.

16. The electro-optical panel according to claim 10, the mounting member comprising a flexible substrate and an external substrate that are different than the first substrate.

17. The electro-optical panel according to claim 10, wherein each of the first wiring and the second wiring comprise at least one wire.

18. The electro-optical panel according to claim 10, wherein contact area between the clock signal input terminal and the first wiring is greater than contact area between the at least one of the image signal input terminals and the second wiring.

19. The electro-optical panel according to claim 10, wherein the mounting member is distinct from and connected to the first substrate.

20. The electro-optical panel according to claim 19, wherein the mounting member is electrically and mechanically connected to a terminal group of the first substrate that comprises the clock signal input terminal and the image signal input terminals.

21. The electro-optical panel according to claim 10, wherein the clock signal input terminal and the at least one of the image signal input terminals are connected between the substrate and the mounting member.

22. The electro-optical panel according to claim 10, wherein the mounting member is implemented as a flexible cable that is connected to the substrate over the clock signal input terminal and over the image signal input terminals.

23. An electro-optical panel comprising:
a substrate;
data lines;
scanning lines intersecting the data lines;
pixels disposed corresponding to intersections between the data lines and the scanning lines;
a clock signal input terminal supplied with a clock signal;
an image signal input terminal supplied with an image signal;
a scanning line drive circuit that outputs scanning signals to the scanning lines, image signals from the data lines supplied to the pixels are selected by the scanning signals;
wherein the data lines, the scanning lines, the pixels, the clock signal input terminal and the image signal input terminal are implemented on the substrate; and
a mounting member that is distinct from and connected to the substrate, the mounting member comprising:
a first wiring that is connected to the clock signal input terminal; and
a second wiring that is connected to the image signal input terminal,
wherein the clock signal input terminal overlaps the first wiring of the mounting member by a larger area than an area at which at least one of the image signal input terminals overlaps the second wiring of the mounting member.

* * * * *

UNITED STATES PATENT AND TRADEMARK OFFICE
CERTIFICATE OF CORRECTION

PATENT NO. : 7,636,146 B2  
APPLICATION NO. : 10/914044  
DATED : December 22, 2009  
INVENTOR(S) : Shin Fujita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 963 days.

Signed and Sealed this

Ninth Day of November, 2010

David J. Kappos  
*Director of the United States Patent and Trademark Office*